(12) United States Patent
Gadzalińska et al.

(10) Patent No.: US 11,931,935 B2
(45) Date of Patent: Mar. 19, 2024

(54) METHOD OF FILLING A MICROCAVITY WITH LAYERS OF POLYMERIC MATERIAL

(71) Applicant: XTPL S.A., Wrocław (PL)

(72) Inventors: Jolanta Gadzalińska, Łódzkie (PL); Łukasz Witczak, Łódzkie (PL); Aneta Wiatrowska, Dolnośląskie (PL); Karolina Fiązyk, Dolnośląskie (PL); Piotr Kowalczewski, Łódzkie (PL); Filip Granek, Dolnośląskie (PL)

(73) Assignee: XTPL S.A., Wrocław (PL)

( * ) Notice: Subject to any disclaimer, the term of this patent is extended or adjusted under 35 U.S.C. 154(b) by 0 days.

(21) Appl. No.: 17/804,939

(22) Filed: Jun. 1, 2022

(65) Prior Publication Data

US 2022/0388211 A1  Dec. 8, 2022

Related U.S. Application Data

(60) Provisional application No. 63/195,282, filed on Jun. 1, 2021.

(51) Int. Cl.
*B29C 45/14*   (2006.01)
*B29C 45/00*   (2006.01)
*B29C 45/16*   (2006.01)
*B29C 45/20*   (2006.01)
*B29K 77/00*   (2006.01)

(52) U.S. Cl.
CPC .... *B29C 45/14344* (2013.01); *B29C 45/0001* (2013.01); *B29C 45/0053* (2013.01); *B29C 45/1657* (2013.01); *B29C 45/20* (2013.01); *B29C 2045/0075* (2013.01); *B29C 2045/0094* (2013.01); *B29K 2077/00* (2013.01)

(58) Field of Classification Search
CPC .................... B29C 45/14344; B29C 45/1657
See application file for complete search history.

(56) References Cited

U.S. PATENT DOCUMENTS

| | | | |
|---|---|---|---|
| 9,289,925 B2 | 3/2016 | Ferguson et al. | |
| 2010/0152880 A1* | 6/2010 | Boyden | A61K 51/1244 |
| | | | 700/283 |
| 2017/0120026 A1* | 5/2017 | Okano | B29C 39/24 |
| 2018/0140815 A1* | 5/2018 | Ono | B05B 12/122 |
| 2020/0398035 A1* | 12/2020 | Zvezdin | B29C 41/36 |

FOREIGN PATENT DOCUMENTS

CN        102458559 A        5/2012

* cited by examiner

*Primary Examiner* — Edmund H Lee
(74) *Attorney, Agent, or Firm* — K&L Gates LLP (57) ABSTRACT

A method of filling a microcavity with layers of a polymer material includes the following steps: (A) estimating a current vertical position of a bottom of the microcavity (current bottom position); (B) lowering the capillary tube into the microcavity towards the current bottom position; (C) dispensing a polymer composition from a tube outlet of the capillary tube under a dispensing applied pressure until the polymer composition substantially fills the microcavity; (D) curing a work piece including the microcavity and the polymer composition in the microcavity to obtain a current layer of the polymer material; and (E) repeatedly executing steps (A), (B), (C), and (D), until the layers of the polymer material have substantially filled the microcavity.

10 Claims, 12 Drawing Sheets

METHOD OF FILLING A MICROCAVITY WITH LAYERS OF POLYMERIC MATERIAL

PRIORITY

This application claims the benefit of U.S. Provisional Application No. 63/195,282 filed Jun. 1, 2021, which is hereby incorporated by reference.

BACKGROUND

Typically, a microcavity is a cavity with lateral dimensions of 150 μm or less, and a depth of 80 μm or less. In semiconductor manufacturing, a microcavity may sometimes be referred to as a via. An additive method for filling a microcavity with a polymer material, such as a photoresist material or a polyimide material is desired. An effective method should preclude cracking and voids in the deposited polymer material. A deposited polymer composition containing 10 vol % solids might shrink by 90% upon drying. The microcavity should preferably be neither underfilled nor overfilled with polymer material.

SUMMARY

In one aspect, a method of filling a microcavity with layers of a polymer material includes the following steps: (A) estimating a current vertical position of a bottom of the microcavity; (B) lowering a capillary tube into the microcavity towards the current vertical position; (C) dispensing a polymer composition from a tube outlet of the capillary tube under a dispensing applied pressure until the polymer composition substantially fills the microcavity; (D) curing a work piece including the microcavity and the polymer composition in the microcavity to obtain a current one of the layers of the polymer material; and (E) repeatedly executing steps (A), (B), (C), and (D), until the layers of the polymer material have substantially filled the microcavity.

In another aspect, a filler in a microcavity includes a sequence of stacked multiple layers of a polymer material in the microcavity, ordered from a bottom of the microcavity to a top of the microcavity. A thickness of each respective layer in the sequence monotonically decreases from a maximum thickness to a minimum thickness.

In yet another aspect, an apparatus for filling a microcavity on or in a substrate with a polymer material includes the following: a substrate stage which supports the substrate; a regulated pneumatic system; a print head including a capillary tube including a tube inlet and a tube outlet, the tube inlet being coupled to the regulated pneumatic system; a print head positioning system configured to vertically position and laterally position the print head relative to the substrate; and a controller electronically coupled to the print head positioning system. The print head is configured to, during each one of multiple iterations, to dispense a polymer composition through the tube outlet under a dispensing applied pressure applied by the regulated pneumatic system until the polymer composition substantially fills the microcavity. The polymer composition in the microcavity is converted to a layer of the polymer material after each iteration. The controller is configured to, during at least one of the multiple iterations, to estimate a current vertical position of a bottom of the microcavity and control the print head positioning system such that the tube outlet is positioned near the current vertical position when dispensing the solution. The estimating of the current vertical position includes estimating a change from a previous vertical position of the bottom of the microcavity in accordance with an estimated thickness of a previous one of the layers of the polymer material.

The above summary of the present invention is not intended to describe each disclosed embodiment or every implementation of the present invention. The description that follows more particularly exemplifies illustrative embodiments. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various embodiments of the disclosure in connection with the accompanying drawings, in which.

DETAILED DESCRIPTION

The present disclosure relates to a method of filling a microcavity with layers of a polymer material, a filler in a microcavity, and an apparatus for filling a microcavity on or in a substrate with a polymer material.

In this disclosure:

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

The recitations of numerical ranges by endpoints include all numbers subsumed within that Range (e.g., 1 to 5 includes 1, 1.5, 2, 2.75, 3, 3.80, 4, 5, etc.).

For any method disclosed herein that includes discrete steps, the steps may be conducted in any feasible order. As appropriate, any combination of two or more steps may be conducted simultaneously.

Figure 1:
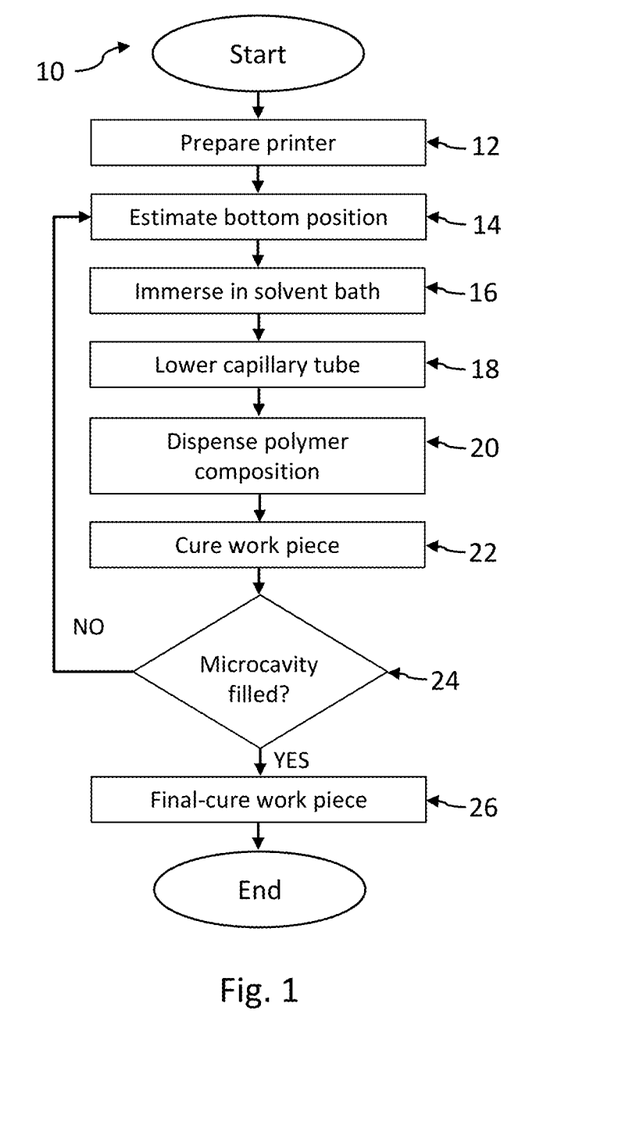
FIG. 1 is a flow diagram of a method of filling a microcavity with layers of a polymer material.
Figure 2:
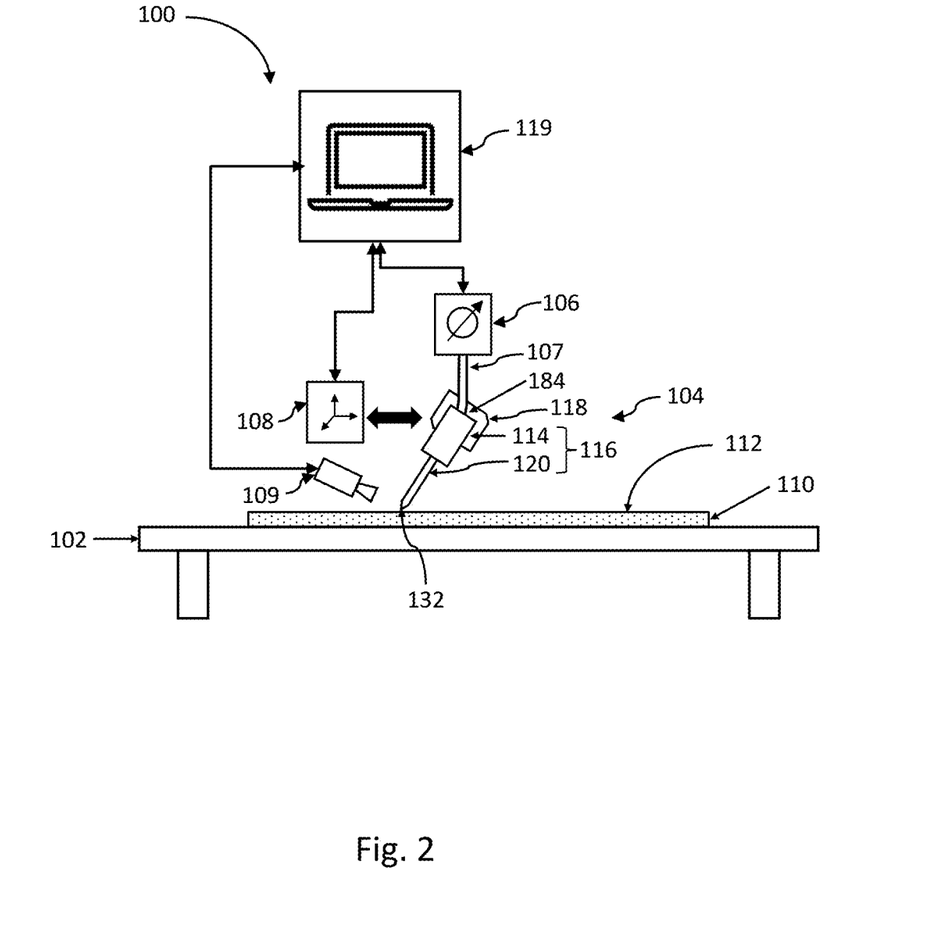
FIG. 2 is a block diagram view of an illustrative printing apparatus, configured as an apparatus for filling a microcavity on or in a substrate with a polymer material.

FIG. 1 is a flow diagram of a method 10 of filling a microcavity with layers of a polymer material. For example, a printing apparatus (printer) is used for carrying out method 10. FIG. 2 is a block diagram view of an illustrative printing apparatus. The printing apparatus 100 includes a substrate stage 102, a print head 104, a regulated pneumatic system 106, a print head positioning system 108, and a controller 119. The printing apparatus 100 can also include an imaging system 109. The substrate stage 102 supports a substrate 110. The substrate 110 is fixed in position on the substrate stage 102 during the printing (dispensing) and has a printable surface 112, which is facing upward and facing towards the print head 104. The print head 104 is positioned above the substrate 110. The print head 104 includes a dispenser 116 and a cartridge holder (dispenser holder) 118. The dispenser 116 includes a piston-cylinder assembly 114 and a capillary tube (nozzle) 120, as described with reference to FIG. 5. Typically, the regulated pneumatic system 106 includes a pump and a pressure regulator. In the example shown in FIG. 2, a pneumatic port 184 of the piston cylinder assembly 114 is coupled to the regulated pneumatic system 106 via tubing 107. Preferably, the regulated pneumatic system 106 can apply pressure in a range of 0 to 9 bar to the pneumatic port 184.

Figure 4:
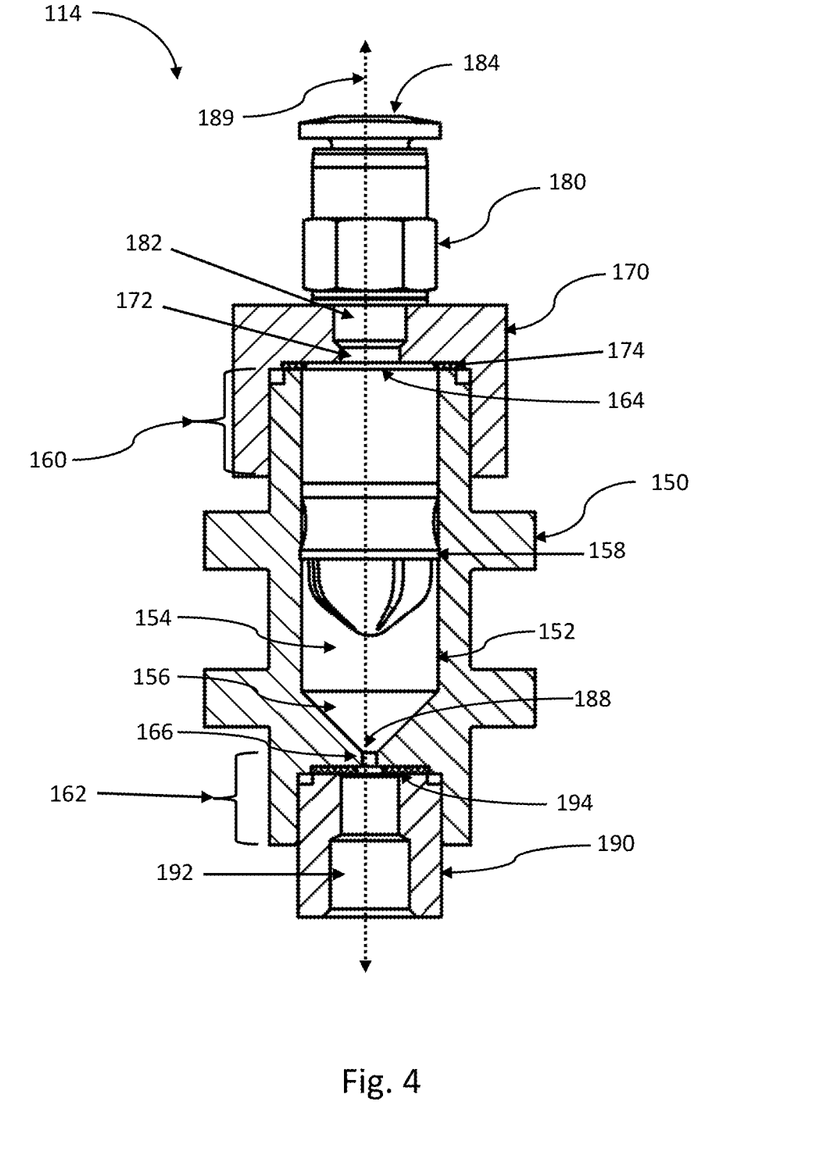
FIG. 4 is a schematic side view and partial cross-sectional view of a piston-cylinder assembly.

A schematic side view and partial cross-sectional view of an exemplary piston-cylinder assembly 114 is shown in FIG. 4. In the example shown, the piston-cylinder assembly 114 includes a cylinder 150, a cylinder cover 170, a pneumatic connector 180, and an intermediate sealing sleeve 190. The cylinder 150 is shown in cross-section to show a cylindrical cavity portion 154 and a conical cavity portion 156. A piston 158 is located inside cylinder 150. The piston 158 contacts an inner surface 152 of cylinder 150. The cylinder 150 has a first end (top end) portion 160 and a second end (bottom end) portion 162 opposite the first end. The cylinder cover 170 is sealably mated to the cylinder 150 at the first end portion 160. In the example shown, an interior surface of the cylinder cover 170 and an exterior surface of the cylinder 150 at its first end portion 160 form a threaded joint. A flat gasket 174 is under compression between the cylinder cover 170 and the cylinder 150 and forms a seal. The intermediate sealing sleeve 190 is sealably mated to the cylinder 150 at the second end portion 162. In the example shown, an exterior surface of the intermediate sealing sleeve 190 and an interior surface of the cylinder 150 at its second end portion 162 form a threaded joint. A flat gasket 194 is under compression between the intermediate sealing sleeve 190 and the cylinder 150 and forms a seal.

The cylinder cover 170 has an opening 172, which retains the pneumatic connector 180. A pneumatic port 184 extends longitudinally through the pneumatic connector 180. The cylinder 150 has a first end 164, in the first end portion 160, and a second end 166, in the second end portion 162. Accordingly, the pneumatic port is at the first end of the cylinder. Air or fluid enters the cylinder from the pneumatic port 184. Inside the cylinder, air or fluid first travels through the cylindrical cavity portion 154 and then a conical cavity portion 156, which tapers to an outlet port 188 at its apex. The outlet port 188 is at the second end 166 opposite the first end 164. The piston 158 is movable in the cylinder 150 between the first end 164 and the second end 166. The piston 158 and the cylinder 150 are movable relative to each along a common longitudinal axis 189 between a first end and a second end of the cylinder.

Figure 5:
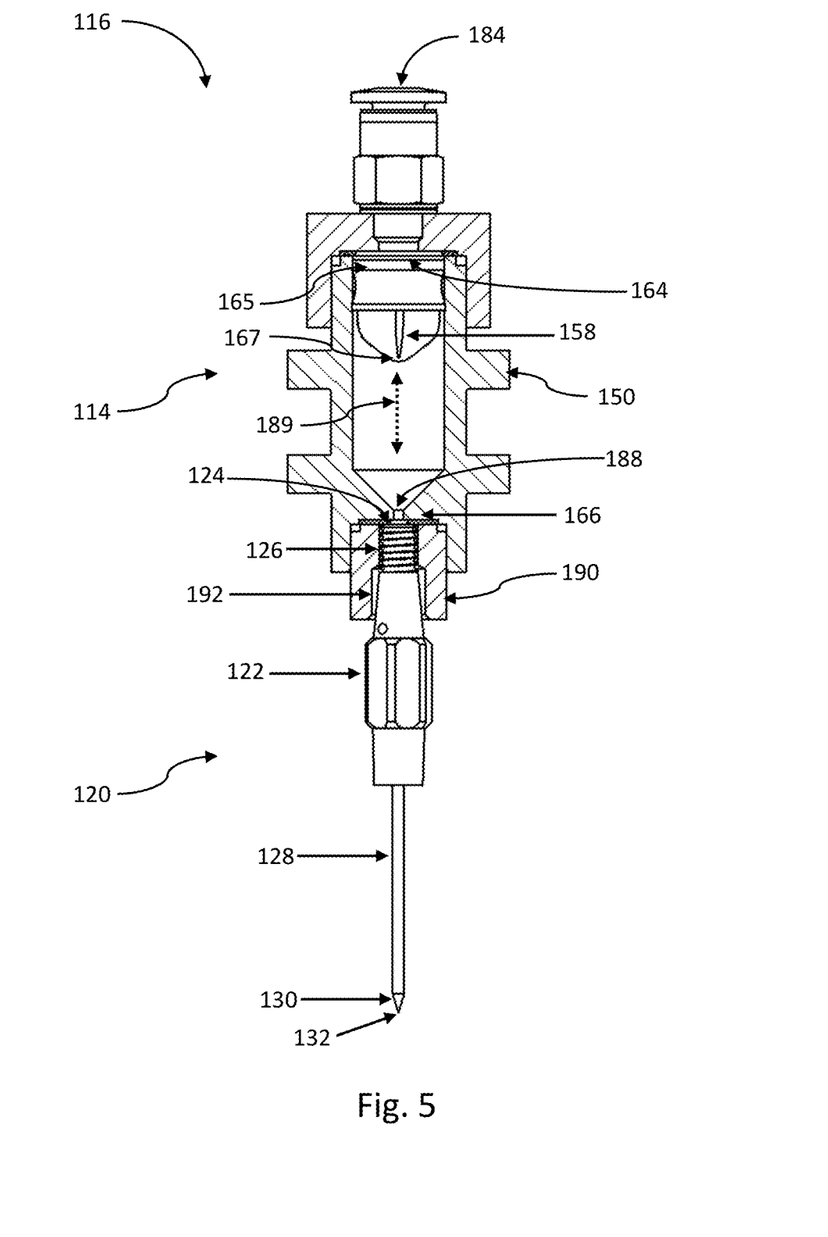
FIG. 5 is a schematic side view and partial cross-sectional view of a dispenser.

FIG. 5 is a schematic side view and partial cross-sectional view of a dispenser 116. The dispenser 116 includes a piston-cylinder assembly 114 (FIG. 4) and a capillary tube (nozzle) 120. Capillary tube 120 has a tube inlet 124 and a tube outlet 132. Capillary tube 120 is described in greater detail with reference to FIG. 3. In the example shown, there is a handle 122, including a threaded portion 126, attached to the capillary tube. The threaded portion 126 and an interior surface 192 of the intermediate sealing sleeve 190 form a threaded joint. Accordingly, the intermediate sealing sleeve retains the handle that is attached to the capillary tube. The tube inlet 124 of capillary tube 120 is coupled to the outlet port 188 at the second end 166 of the cylinder 150. A capillary tube is installed in the piston-cylinder assembly, to form a dispenser. The tube inlet 124 of the capillary tube 120 is coupled to the regulated pneumatic system 106.

Commercially available glass capillary tubes can be used in the dispenser. For example, glass capillary tubes (Eppendorf™ Femtotips™ II Microinjection Capillary Tips), having an inner diameter at the tip of 0.5 μm and an outer diameter at the tip of 0.7 μm, are available from Fisher Scientific. A commercially available glass capillary tube 120 is shown schematically in FIG. 3. The glass capillary tube has an inlet 124 at a first end, and outlet 132 at a second end opposite the first end, and an elongate fluid passageway between the inlet 124 and outlet 132. A plastic handle 122 is attached to the glass capillary tube 120 around its circumference. The plastic handle 122 includes an inlet (input end) 124 and a threaded portion 126 near the inlet 124 which enables a threaded connection to an external body or external conduit (see FIG. 5). The inlet 124 has an inner diameter of 1.2 mm.

Figure 3:
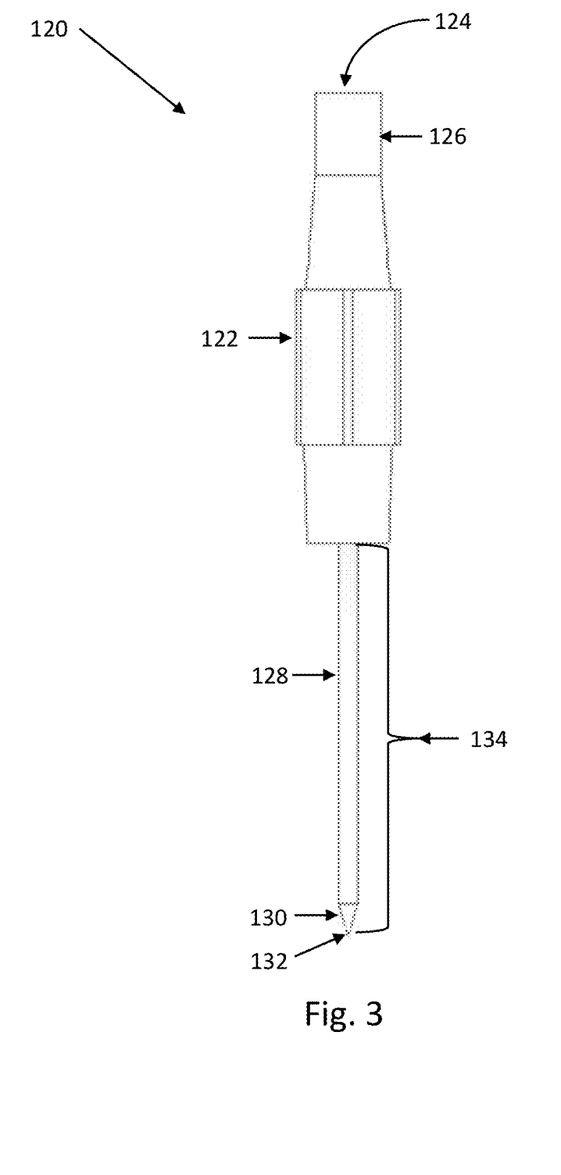
FIG. 3 is a schematic side view of a glass capillary tube.

The glass capillary tube includes an elongate input portion 128 and a tapering portion 130. There is an externally visible portion 134 of the glass capillary tube 120. Some of the elongate input portion 128 may be obscured by the surrounding plastic handle 122. The tapering portion 130 tapers to an outlet (output end) 132 (having an inner diameter of 0.5 μm and an outer diameter at the tip of 0.7 μm in the case of the certain Femtotips™ II Microinjection Capillary Tips). In many cases it is desirable to increase the size of the outlet (outlet size). It is possible to increase the outlet size by cutting the glass capillary tube 120 at a suitable longitudinal location along the tapering portion 130. Cutting may be done using a focused-ion beam (FIB) apparatus. Glass capillary tubes in which the tube outlet has an outer diameter in a range of 0.7 μm to 8 μm are preferred. Stainless-steel capillary tubes can also be used.

In preparing the printing apparatus 100 for use, a composition (e.g., a polymer composition or a metallic nanoparticle composition) is injected into the cylinder 150. In the case of the piston-cylinder assembly shown in FIG. 4, this can be accomplished by injecting the composition into the cylinder 150 via its first end 164 using a syringe, with the piston 158 removed from the cylinder and the cover 170 and the pneumatic connector 180 detached from the cylinder 150. Subsequently, the piston is positioned in the cylinder. In preparing the printing apparatus 100 for use, the cylinder cover 170 and the pneumatic connector 180 are attached to the cylinder 150 (FIG. 4 example). In preparing the printing apparatus 100 for use, the pneumatic port 184 is coupled to a regulated pneumatic system 106 via tubing 107.

Figure 6:
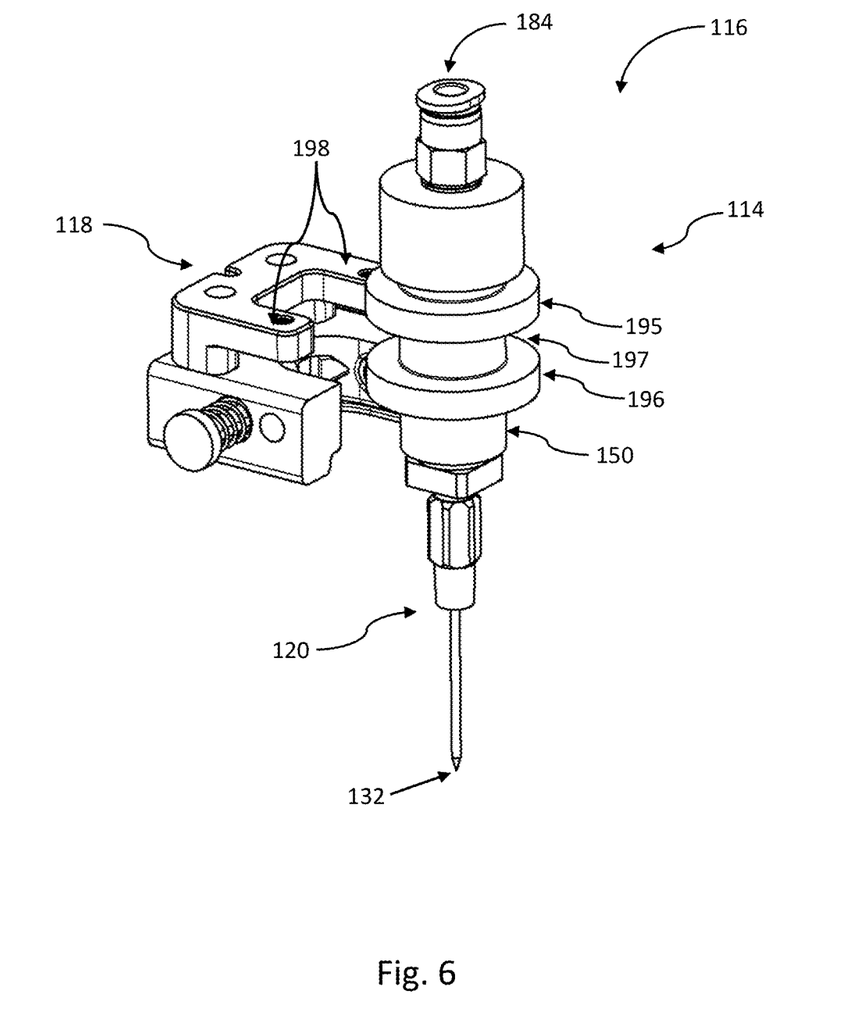
FIG. 6 is a schematic perspective view of a dispenser and an associated dispenser holder.

FIG. 6 is a schematic perspective view of a dispenser 116 and an associated dispenser holder 118. The dispenser holder 118 includes a fork 198. When assembled, the fork is inserted into a groove 197 between two annular protrusions 195, 196 that protrude radially outward from the outer walls of the cylinder 150. Accordingly, the dispenser holder 118 retains the dispenser. The dispenser holder 118 is mechanically coupled to the print head positioning system 108. In preparing the printing apparatus 100 for use, the dispenser 116 is installed in the dispenser holder 118.

As shown in FIG. 2, the imaging system 109 captures images of the capillary tube outlet 132 and a portion of the substrate's printable surface 112 near the capillary tube outlet 132. The imaging system 109 is used to monitor a vertical distance (height) between the capillary tube outlet 132 and a surface on which the composition is dispensed, such as the printable surface 112 of the substrate 110. The print head positioning system 108 is configured to vertically position and laterally position the print head (e.g., the outlet of the capillary tube) relative to the substrate. The print head positioning system 108 controls the vertical displacement of the print head 104 and the lateral displacement of the print head 104 relative to the substrate. In dispensing (extruding) a composition, regulated pressure is applied to a piston in the piston-cylinder assembly. The dispensing relies solely on the applied pressure; the dispensing (extruding) is carried out without the application of electric fields to the composition.

Printing apparatus 100 preferably includes a controller 119 (FIG. 2). For example, controller 119 includes a computer with the hardware and software necessary for communicating with and controlling the imaging system 109, the print head positioning system 108, and the pneumatic system 106. Preferably, the controller determines, using image data from the imaging system 109, a current vertical distance between the nozzle outlet and the surface (the surface on which the composition is being dispensed). The controller 119 is electronically coupled to the print head positioning system 108. In accordance with the current vertical distance, the controller 119 controls the print head positioning system 108 to maintain a vertical distance within a desired range.

Figure 10:
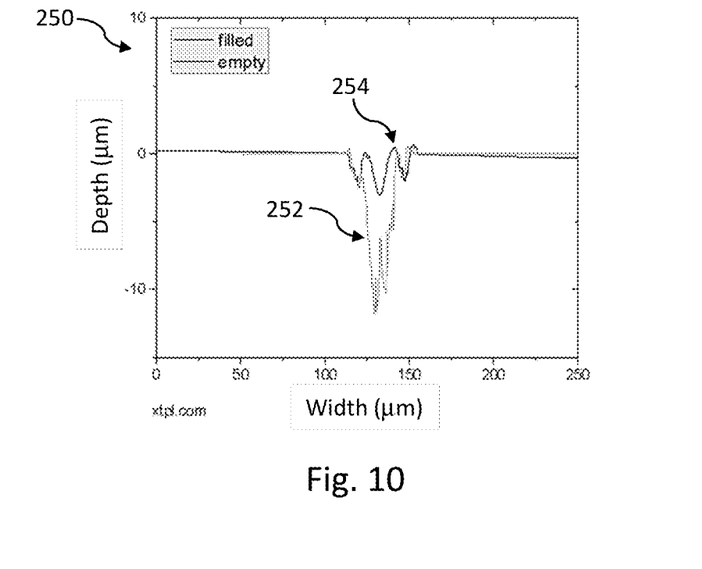
FIG. 10 is a graphical plot of a cross-sectional profile, obtained using a confocal microscope, of a microcavity (approximate diameter 25 μm, approximate depth 10 μm) before and after filling with a polymer material.
Figure 11:
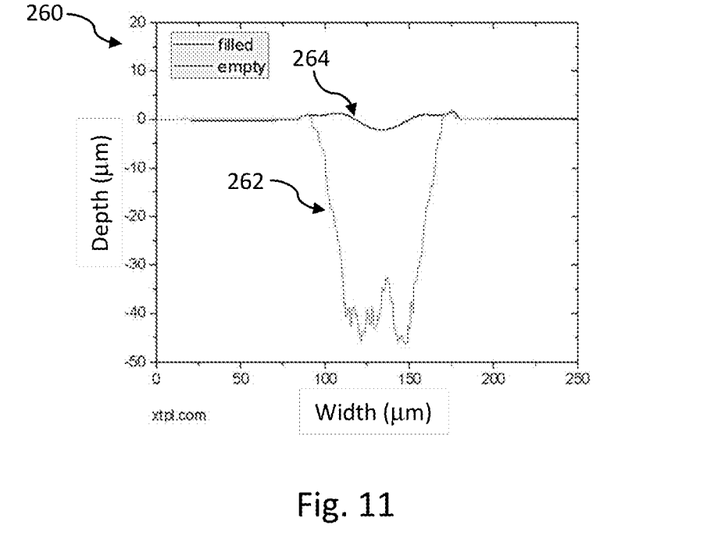
FIG. 11 is a graphical plot of a cross-sectional profile, obtained using a confocal microscope, of a microcavity (approximate diameter 75 μm, approximate depth 50 μm) before and after filling with a polymer material.
Figure 12:
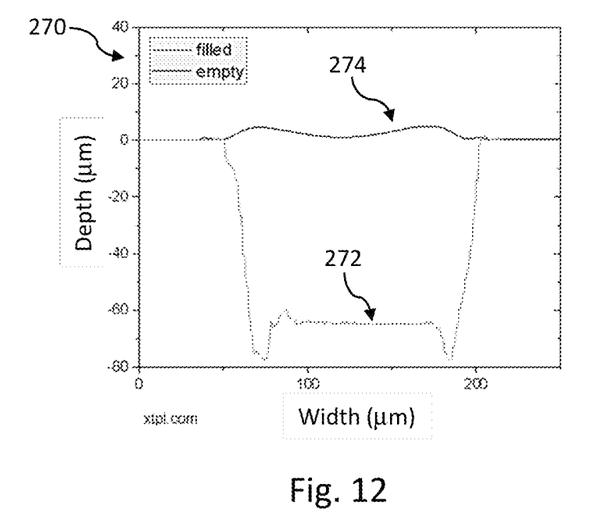
FIG. 12 is a graphical plot of a cross-sectional profile, obtained using a confocal microscope, of a microcavity (approximate diameter 150 μm, approximate depth 80 μm) before and after filling with a polymer material.

Method 10 (FIG. 1) of filling a microcavity with layers of a polymer material includes steps 12, 14, 16, 18, 20, 22, 24, and 26. Preferably, the method is used for filling a microcavity having a depth in a range of 5 to 80 μm and a lateral span dimension in a range of 10 to 150 μm. FIGS. 10, 11, and 12 show graphical plots of confocal microscope data for three microcavities. FIG. 10 is a graphical plot 250 of a cross-sectional profile, obtained using a confocal microscope, of a microcavity (approximate diameter 25 μm, approximate depth 10 μm) before and after filling with a polymer material. Data points 252 represent the state before filling with the polymer material and data points 254 represent the state after filling with the polymer material. FIG. 11 is a graphical plot 260 of a cross-sectional profile, obtained using a confocal microscope, of a microcavity (approximate diameter 75 μm, approximate depth 50 μm) before and after filling with a polymer material. Data points 262 represent the state before filling with the polymer material and data points 264 represent the state after filling with the polymer material. FIG. 12 is a graphical plot 270 of a cross-sectional profile, obtained using a confocal microscope, of a microcavity (approximate diameter 150 μm, approximate depth 80 μm) before and after filling with a polymer material. Data points 272 represent the state before filling with the polymer material and data points 274 represent the state after filling with the polymer material. In these examples, the polymer material has substantially filled the respective microcavities.

Figure 13:
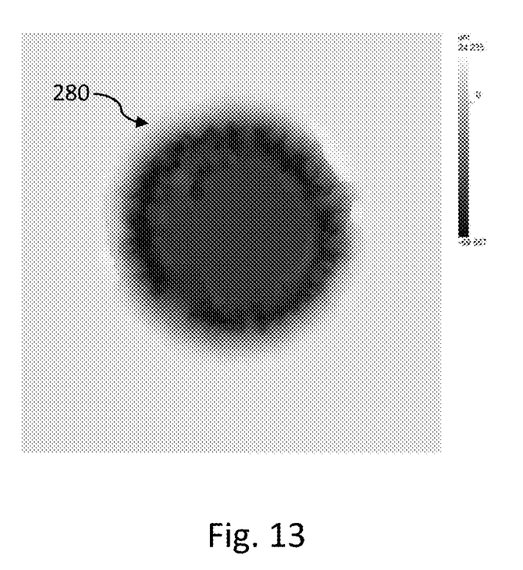
FIG. 13 is a plan view of confocal microscope data for the microcavity of FIG. 12 before filling with a polymer material.

In the examples shown, the microcavities were formed by laser etching in a silicon wafer. The laser-etched openings were approximately circular. For example, FIG. 13 is a plan view of confocal microscope data for the microcavity of FIG. 12 (approximate diameter 150 μm, approximate depth 80 μm) before filling with a polymer material. Hence, we refer to the lateral span dimension of the microcavity as a diameter in these cases.

At step 12, the printing apparatus (printer) (FIG. 2) is configured and prepared. The printing apparatus is described with reference to FIG. 2. Step 12 includes preparing polymer composition for use, including injecting the polymer composition in the cylinder 150. In the examples shown herein, a polyimide solution (Restek Corporation, catalog number 20445) was used as the polymer composition. According to the provided safety data sheet, the polyimide solution has the following composition: 1-methyl-2-pyrrolidone (60-80%), hydrotreated light distillate (jet fuel A) (10-20%), polyimide polymer (<20%), and toluene (<0.1%). The polyimide solution had a viscosity of approximately 1000 cP. Typically, polymer compositions having a viscosity in a range of 200 cP to 1000 cP can be used herein. The polymer material is not limited to polyimide. Other polymers can be used if polymer composition within the preferred viscosity range can be obtained. Solvents suitable for the polymer solution are those that are compatible with the polymer, i.e., the polymer can be homogeneously dissolved in the solvent.

Figure 7:
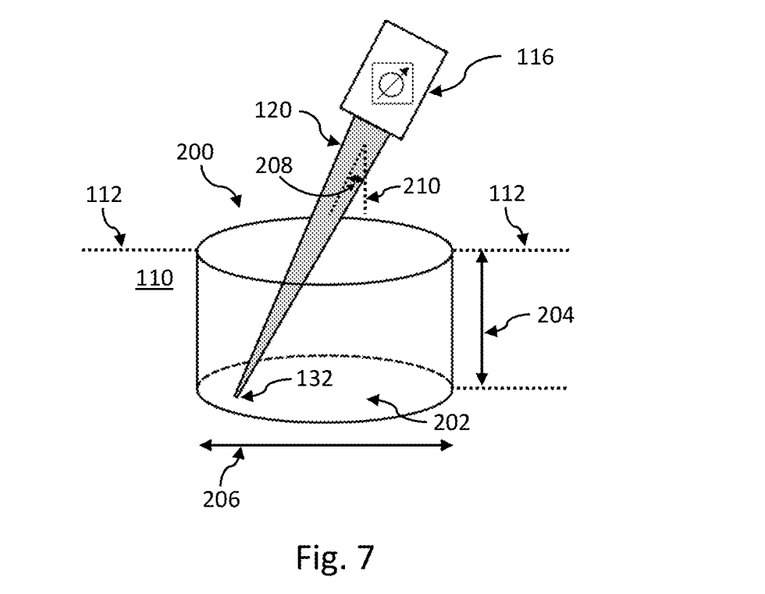
FIG. 7 is a schematic view of a microcavity and a capillary tube of a dispenser positioned in the microcavity.

At step 14, a current vertical position of a bottom of the microcavity is estimated. FIG. 7 is a schematic view of a microcavity 200 and a capillary tube 120 of a dispenser 116 positioned in the microcavity 200. The microcavity is positioned in a substrate 110. Typically, the dispenser is oriented such that a longitudinal axis of the capillary tube 120 is tilted at a tilt angle 208 relative to a vertical axis 210. Preferably, the tilt angle 208 is in a range of 0 to 40 degrees. FIG. 7 shows a state of the microcavity 200 before it has been filled with polymer material. A current vertical position of a bottom 202 of the microcavity 200 is estimated to be a vertical distance 204 below the substrate surface 112.

FIG. 7 shows an example of estimating a current vertical position of a bottom of the microcavity. FIG. 7 shows the capillary tube 120 being lowered into the microcavity 200. When the capillary tube outlet 132 contacts the bottom 202, the capillary tube 120 bends. The current vertical position of the bottom 202 can be estimated by observing a vertical position at which the capillary tube 120 bends. The observation can be carried out using the imaging system 109. The estimated current vertical position of the bottom (as measured with respect to a reference, such as the substrate surface 112) can be stored by the controller 119. The observation of the bending of the capillary tube is facilitated by holding the capillary tube at a tilt angle 208.

At step 16, the capillary tube outlet 132 is immersed in a solvent bath under an initializing applied pressure. For example, the printing apparatus additionally includes a solvent bath station and step 16 is carried out at the solvent bath station. The initializing applied pressure is selected to be sufficient to cause the polymer composition to be dispensed from the tube outlet. Preferably, the initializing applied pressure is in a range of 1500 to 5000 mbar. For example, solvents that are used in the polymer composition (polymer solution) can also be used in the solvent bath. When the capillary tube is lowered into the microcavity to observe the bending of the capillary tube 120 (step 14, FIG. 7), there may be no polymer composition being dispensed from the capillary tube 120. The capillary tube may be clogged. Under the initializing applied pressure, the capillary tube becomes unclogged.

At step 18, the capillary tube 120 is moved from the solvent bath station to the microcavity and lowered into the microcavity. During this step 18, a pressure lower than the initializing applied pressure is typically applied by the regulated pneumatic system. The applied pressure is sufficiently high that the polymer composition continues to flow out from the capillary tube outlet 132. The polymer composition can climb upward along an exterior surface of the capillary tube 120.

At step 20, the polymer composition is dispensed from the capillary tube outlet under a dispensing applied pressure until the polymer composition substantially fills the microcavity. Step 20 is carried out when the capillary tube outlet is positioned in the microcavity near the current vertical position of the bottom 202. The capillary tube outlet should be sufficiently close to the current vertical position of the bottom 202 such that a meniscus of the polymer composition contacts the bottom 202. Accordingly, under the dispensing applied pressure, the polymer composition flows into the microcavity 200. Preferably, the dispensing applied pressure is in a range of 1500 to 5000 mbar.

At step 20, it is important that the polymer composition substantially fills the microcavity without overflowing. It is preferable that the polymer composition be dispensed for a predetermined dispensing time. The controller 119 can estimate a volume of the microcavity 200 in accordance with the estimated depth 204 and an estimated diameter 206. The controller 119 can determine the predetermined dispensing time in accordance with the estimated volume and a flow rate of the polymer composition from the capillary tube.

At step 22, the work piece is cured to obtain a current one of the layers of the polymer material. At step 22, the polymer composition in the cavity is converted to a current one of the layers of the polymer material. The work piece would typically include the substrate and any microcavities in the substrate, as well as the polymer composition in the microcavities. Typically, step 22 includes heating the work piece to a temperature in a range of 150 to 230° C. The polymer composition may include a solvent. Solvents suitable for the polymer solution are those that are compatible with the polymer, i.e., the polymer can be homogeneously dissolved in the solvent. During the curing, at least some of the solvents are removed, by solvent evaporation. Additionally, the polymer composition may include a polymer precursor and the polymer precursor may be converted to the polymer material during the curing.

Figure 8:
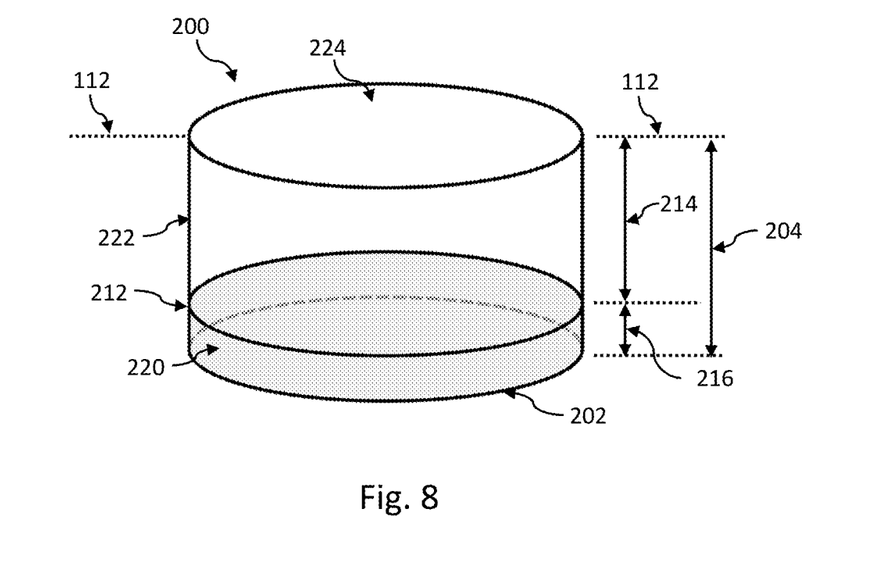
FIG. 8 is a schematic view of a microcavity containing a polymer material.

The polymer composition/polymer material undergoes contraction (shrinkage) at step 22. FIG. 8 shows a simplified view of a state of the microcavity 200 after carrying out step 22. A polymer composition had substantially filled the microcavity 200 at step 20. As a result of the contraction, there is a layer 220 of polymer material filling a portion of the microcavity 200 from its bottom 202 to a height 216 above the bottom 202. In addition, there is likely a layer of polymer material along a sidewall 222 of the microcavity 200. There is a remaining portion 224 of the microcavity 200 that needs to be filled with the polymer material. A depth 214 of this remaining portion 224 is estimated to be a difference between the original depth 204 of the microcavity 200 and the thickness 216 of the currently deposited layer 220 of the polymer material.

Steps 14, 16, 18, 20, and 22 are repeated until the layers of the polymer material have substantially filled the microcavity 200 (decision step 24). Step 16 of immersing the tube outlet in a solvent bath under an initializing applied pressure is an optional step. For example, step 16 might be necessary when the capillary tube is clogged. For example, it may be preferable to carry out step 16 before each iteration of step 20 (dispensing) to prevent capillary clogging. Consider a second iteration of step 14, at a state of the microcavity as shown in FIG. 8. The bottom of the microcavity 200 has moved from 202 to 212, at the top of the previous layer 220 of polymer material. It is possible to estimate the current vertical position of the bottom of the microcavity by observing the vertical position at which the capillary tube bends (FIG. 7). Alternatively, it is possible to estimate a change from a previous vertical position (202) of the bottom of the microcavity in accordance with an estimated thickness 216 of a previous layer of the polymer material (220).

Figure 9:
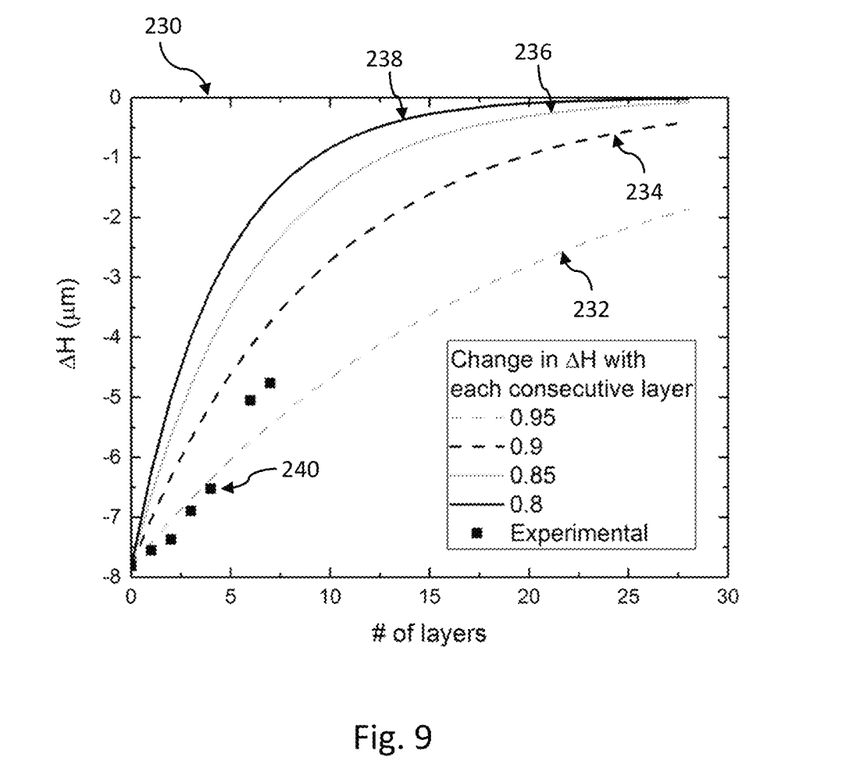
FIG. 9 is a graphical plot showing a dependence of a current vertical position of a bottom of a microcavity on the number of layers of polymer material.

A vertical position of the bottom of the microcavity can be measured or estimated as a function of the number of layers deposited (number of iterations of steps 14, 18, 20, and 22). The vertical position $\Delta H$ can be measured or estimated relative to the top of the microcavity 200, which coincides with the substrate surface 112 in this case. FIG. 9 is a graphical plot 230 showing a dependence of a current vertical position $\Delta H$ of a bottom of a microcavity on the number of layers of polymer material. The original vertical position $\Delta H$ (original depth) was approximately $-8$ μm. The microcavity had a depth 204 of approximately 8 μm and a diameter 206 of approximately 25 μm. Lines 232, 234, 236, and 238 are calculated plots of $\Delta H$ for volume contraction coefficients of 95%, 90%, 85%, and 80%, respectively. Lines 232, 234, 236, and 238 are calculated under a simplifying assumption that no polymer material is deposited on the sidewall 222. Additionally, data points 240 (black squares) are experimental results in which the $\Delta H$ values were measured using contact profilometer. Under these experimental conditions, $\Delta H$ can be approximated by a volume contraction coefficient of around 95% when the number of layers is less than 5, and $\Delta H$ can be approximated by a volume contraction coefficient in a range of 90 to 95% when the number of layers is more than 5.

After the layers of the polymer material have substantially filled the microcavity 200, step 26 can be carried out. Step 26 is an optional step. Step 26 includes a final cure of the work piece. Typically, step 26 includes heating the work piece to a temperature in a range of 150 to 230° C. It may be preferable to carry out step 26 to completely remove solvents from the microcavity or to completely convert a polymer precursor to the polymer material.

FIGS. 10, 11, and 12 show the confocal microscopy data for the respective microcavities before and after filling with the polyimide polymer (Restek). The following printing parameters were used: outer diameter of tube outlet of glass capillary tube: 5 μm, initializing applied pressure 5000 mbar, dispensing applied pressure 1500-5000 mbar, curing temperature 150° C., duration of curing 6 min 40 s, final curing temperature 230° C., duration of final curing 60 min. Certain results for the respective microcavities are tabulated in Table 1. Table 1 lists the following information for each of FIGS. 10, 11, and 12: diameter of the original microcavity, depth of the original microcavity, number of layers deposited (number of iterations of steps 20 and 22), and dispensing time at step 20 (the dispensing time varies in accordance with the number of layers previously deposited in the microcavity).

TABLE 1

| FIG. No. | Microcavity Diameter (µm) | Microcavity Depth (µm) | No. of Layers | Dispensing Time (sec) |
|---|---|---|---|---|
| 10 | 25 | 10 | 8 | 0.2-0.4 |
| 11 | 75 | 50 | 14 | 3-10 |
| 12 | 150 | 80 | 14 | 20-64 |

As a result of carrying out method 10 (FIG. 1), a filler is formed in a microcavity. The filler includes a sequence of stacked multiple layers of a polymer material in the microcavity. For each successive iteration of step 20 (dispensing polymer composition), the dispensing time decreases because the remaining volume of the microcavity decreases. Accordingly, for each successive iteration of step 20, the thickness of each layer of polymer material decreases. If we order the sequence of stacked layers from a bottom of the microcavity to a top of the microcavity, a thickness of each respective layer in the sequence monotonically decreases from a maximum thickness to a minimum thickness. The number of stacked layers can be 8 or more, or 14 or more. The microcavities can have depths in a range of 5 to 80 µm and diameters (more generally, lateral span dimensions) in a range of 10 to 150 µm.

Figure 14:
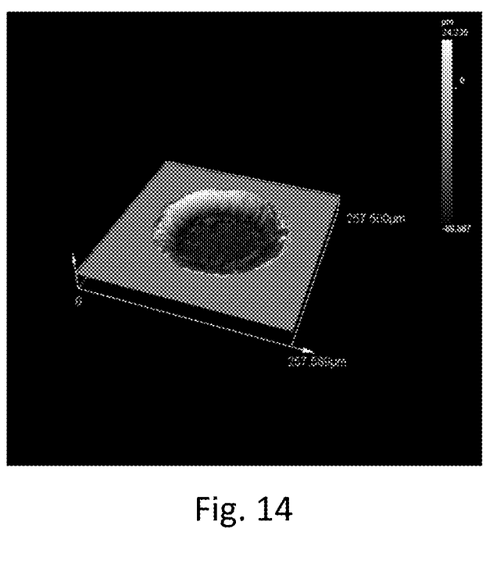
FIG. 14 is a perspective view of confocal microscope data for the microcavity of FIG. 12 before filling with a polymer material.
Figure 15:
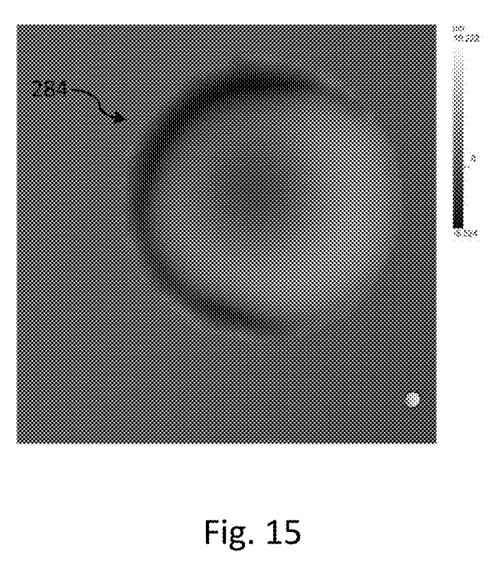
FIG. 15 is a plan view of confocal microscope data for the microcavity of FIG. 12 after filling with a polymer material.
Figure 16:
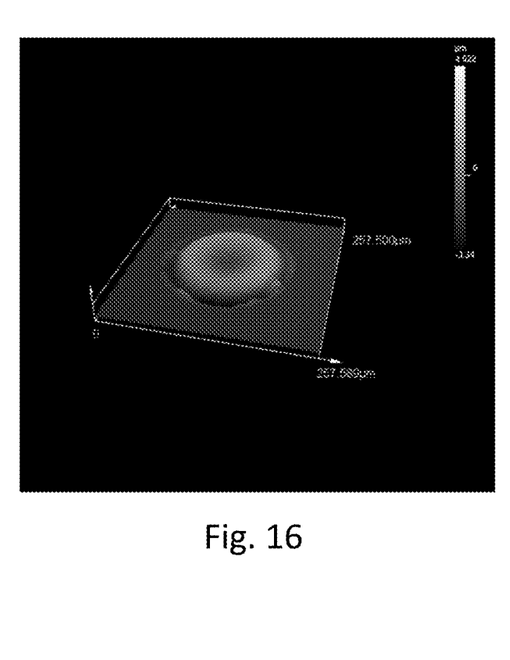
FIG. 16 is a perspective view of confocal microscope data for the microcavity of FIG. 12 after filling with a polymer material.

The microcavity shown in FIG. 12 (original diameter 150 µm, original depth 80 µm) was observed under confocal microscopy before and after filling with the polymer material. FIGS. 13 and 14 show the confocal microscopy data before filling with the polymer material. FIGS. 15 and 16 show the confocal microscopy data after filling with the polymer material. FIGS. 13 and 15 are plan views of the confocal microscopy data 280, 284 and show the height or depth profiles. FIGS. 14 and 16 are perspective views of the confocal microscopy data 282, 286. The confocal microscopy data show the height or depth profiles in three dimensions: X-axis 290, Y-axis 292, and Z-axis 294. The substrate surface extends along the X-axis 290 and the Y-axis 292. The depths and heights are along the Z-axis 294. After filling the microcavity with the polymer material, the heights of the peaks and the depths of the valleys of the filler are much smaller than the original depth of the microcavity, indicating that the layers of the polymer material have substantially filled the microcavity.

What is claimed is:

1. A method of filling a microcavity with layers of a polymer material, comprising the steps of:
    (A) estimating a current vertical position of a bottom of the microcavity;
    (B) lowering a capillary tube into the microcavity;
    (C) dispensing a polymer composition from a tube outlet of the capillary tube under a dispensing applied pressure until the polymer composition substantially fills the microcavity;
    (D) curing a work piece comprising the microcavity and the polymer composition in the microcavity to obtain a current one of the layers of the polymer material; and
    (E) repeatedly executing steps (A), (B), (C), and (D), until the layers of the polymer material have substantially filled the microcavity.

2. The method of claim 1, additionally comprising the steps of:
    (F) immersing the tube outlet in a solvent bath under an initializing applied pressure, the initializing applied pressure being sufficient to cause the polymer composition to be dispensed from the tube outlet;
    wherein step (E) additionally comprises repeatedly executing step (F), until the layers of the polymer material have substantially filled the microcavity.

3. The method of claim 2, wherein the initializing applied pressure is in a range of 1500 to 5000 mbar and the dispensing applied pressure is in a range of 1500 to 5000 mbar.

4. The method of claim 1, additionally comprising the step of:
    (G) finally curing the work piece after the layers of the polymer material have substantially filled the microcavity.

5. The method of claim 4, wherein step (G) comprises heating the work piece to a temperature in a range of 150 to 230° C. and step (D) comprises heating the work piece to a temperature in a range of 150 to 230° C.

6. The method of claim 1, wherein step (A) comprises lowering the capillary tube into the microcavity and observing a vertical position at which the capillary tube bends.

7. The method of claim 1, wherein step (A) comprises estimating a change from a previous vertical position of the bottom of the microcavity in accordance with an estimated thickness of previous one of the layers of the polymer material.

8. The method of claim 1, wherein the microcavity has a depth in a range of 5 to 80 µm and a lateral span dimension in a range of 10 to 150 µm.

9. The method of claim 1, wherein the polymer material comprises polyimide and the polymer composition comprises a viscosity in a range of 200 to 1000 cP.

10. The method of claim 1, wherein the tube outlet has an outer diameter in a range of 0.7 µm to 8 µm and the capillary tube is a glass capillary tube.

* * * * *